(12) United States Patent
Ott et al.

(10) Patent No.: US 6,371,635 B2
(45) Date of Patent: Apr. 16, 2002

(54) LIGHTING DEVICE FOR VEHICLES

(75) Inventors: Alfred Ott, Gaeufelden; Uwe Frederking, Leinfelden; Wener Heinz, Tiefenbronn; Karsten Eichhorn, Ennigerloh; Ewald Topp, Anroechte; Gerhard Jost, Arnsberg; Micheal Wuestefeld, Lippstadt; Stefan Wiesner, Erwitte, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/748,246

(22) Filed: Dec. 27, 2000

(30) Foreign Application Priority Data

Dec. 27, 1999 (DE) .......................... 199 63 337

(51) Int. Cl.$^7$ ................................. F21V 9/00
(52) U.S. Cl. .................. 362/511; 362/554; 362/580; 362/544; 362/545; 362/547; 362/294
(58) Field of Search ................ 362/554, 580, 362/581, 511, 544, 545, 547, 548, 294

(56) References Cited

U.S. PATENT DOCUMENTS 5,436,806 A * 7/1995 Kato ........................... 362/511
5,601,354 A * 2/1997 Horii et al. .................. 362/511

FOREIGN PATENT DOCUMENTS

EP 0678699 B1 10/1995

* cited by examiner

*Primary Examiner*—Stephen Husar
(74) *Attorney, Agent, or Firm*—Birch, Stewart, Kolasch & Birch

(57) ABSTRACT

Disclosed is a lighting device for a vehicle, having a light-decoupling element in a decoupling bay of the vehicle. The light-decoupling element is fed by a light source arranged at a distance, where an optical fiber connects the light source and the light decoupling element. A light panel is used to achieve a visual shielding of an inner bay containing structural elements and components. The light panel facilitates a visual shielding of the rear inner bay.

18 Claims, 3 Drawing Sheets

LIGHTING DEVICE FOR VEHICLES

BACKGROUND OF THE INVENTION

1. Field of the Invention

The present invention relates to a lighting device for vehicles with an optical fiber that guides a light emitted from a light source into a decoupling bay of the vehicle, with at least one light-decoupling element coupled in the decoupling bay and connected to an end of the optical fiber. The light decoupling element emits the light according to a predetermined light distribution into the environment.

2. Related Art

From EP 0 678 699 B1, a lighting device for vehicles is known which has light decoupling elements formed to allow the generation of a predetermined distribution of light e.g. to provide low beam, high beam or fog light functionality. The light decoupling elements are arranged on peripheral areas of the vehicle's body shell. The light-decoupling element is connected to an optical fiber; a light generated by a light source is coupled to the other end of the optical fiber and transmitted to the light-decoupling element via the optical fiber. This type of lighting system facilitates a space saving decoupling of the light because the contour of a body opening may be adapted to the contour of the light decoupling element. Alternatively, however, it is possible to arrange the light decoupling elements like a headlight casing in a common decoupling bay. Appropriately, this decoupling bay is covered with a preferably translucent covering pane.

SUMMARY OF THE INVENTION

An object of the present invention is to further develop a lighting device for vehicles in which a light-decoupling element in the off state will provide a homogeneous visual appearance of a decoupling bay.

To achieve the object of the present invention, the lighting device in accordance with the present invention includes an opening in the decoupling bay tightly sealed by means of a covering pane and that at a distance to the covering pane a light panel is envisaged extending across the decoupling bay at an angle to an optical axis of the light decoupling element and separates the decoupling bay into a front bay facing the covering pane and a rear bay opposite to the covering pane, and that the light panel is designed so that the components arranged in the rear bay are optically covered.

An advantage of the present invention is that the light panel is envisaged separating the decoupling bay into a front bay facing the covering pane and a rear bay opposite to the covering pane whereby, essentially, as a result of the light panel placement a visual view of the decoupling bay is ensured as predetermined by design/technical requirements. This prevents distinguishing the structural elements and components arranged in the rear bay, thereby ensuring the decoupling bay generates a homogeneous visual appearance.

In accordance with a specific embodiment of the present invention, the light panel is made of a translucent material and is structured, e.g. ribbed in such a way that the structural elements and components arranged in the rear bay appear only in a blurred manner. This creates a homogeneous visual appearance of the decoupling bay, which is not dictated by the geometry of the structural elements and components arranged in the rear bay.

Moreover, in accordance with the present invention, the light panel is made of a semi-translucent or opaque material to ensure the homogeneous appearance of the rear bay and the decoupling bay, respectively.

Furthermore, in accordance with the present invention, an additional light source or a light decoupling element is arranged in the rear bay in such a manner that a background illumination of the light panel is created, which has the effect of visually highlighting the decoupling bay and the rear bay, respectively. With a translucent pane, this background illumination can be used to illuminate certain lighting components such as the light decoupling element and highlight them during an off state. Moreover, such background illumination together with a semi-translucent panel can serve as a position light whereby the light penetrates through the light panel relatively evenly in the direction of the covering pane.

In accordance with an embodiment of the present invention, the light panel or the light source and the light-decoupling element, respectively, providing the background illumination, may be colored such that an additional predetermined color effect may be generated.

In accordance with a preferred embodiment of the present invention, the light panel is fitted with through openings in such a way that an airflow generated by a heating/ventilation device in the rear bay can be guided onto the covering pane. This facilitates heating and/or ventilation of the covering pane.

In accordance with a variant of the present invention, the through openings can be provided in the form of slots arranged at a predetermined parallel distance from each other and preferably extending across the entire surface of the light panel.

Alternatively, a slit may be formed, as a result of the light-decoupling element not accurately adjoining with a receiving opening of the light panel, whereby the slit is formed between the external edge of the light decoupling element and a corresponding edge of the receiving opening. Preferably, the receiving opening of the light panel may be provided on the one hand to receive the light decoupling element and facilitate an unobstructed light radiation for a predetermined lighting function. On the other, the sizing of the receiving opening allows the air to penetrate through the formed slit.

In accordance with the development of the present invention, the through openings are arranged in the light panel in a circular manner and distributed across the light panel like a grid. The arrangement generates a specific visual effect and; moreover, the through openings can be used to receive light sources, e.g. light-emitting diodes.

Additionally, in accordance with the present invention, a heating element can be fitted in a lower area between the light panel and the covering pane, preferably in the lower periphery of the covering pane and the light panel, respectively, thereby providing for an efficient heating of the covering pane.

Alternatively, the heating element can also be arranged on the surface of the light panel opposite to the covering pane, preferably in the lower area thereof, such that the heating element is hidden by the panel. In connection with an air diffuser, specifically with a fan, arranged in the rear bay, an air circulation and diffusion, respectively, can be generated such that the airflow is guided onto the covering pane. Preferably, the air diffuser is geared to the shape of the slots in the light panel such that the heated airflow can be guided effectively onto the covering pane.

Furthermore, in accordance with the present invention, a reflector for reflecting heat radiation is formed on the light panel, such that the heat yield of the heating element is increased. Preferably, the reflector is located on a surface of the light panel facing the covering pane in a lower part thereof. This arrangement provides for a reduction of the heat radiation distance from the heating element to the covering pane.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
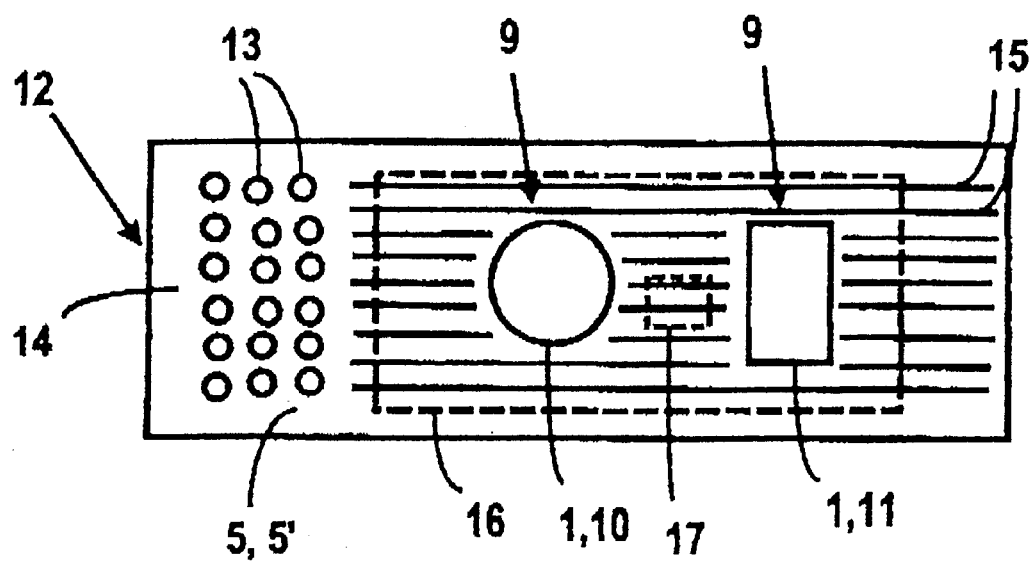
FIG. 1 illustrates a schematic view of an illumination device with a light panel in accordance with a first embodiment of the present invention.

Referring to the Figures, the illumination device according to the present invention includes one or several light decoupling elements 1 each of which is linked to a light source arranged at the distant end of a decoupling bay 3 via an optical fiber 2. The decoupling bay 3 is located, similar to a regular headlamp, in an area of an outer surface of a vehicle's body and is limited by a casing rimmed in a body opening (not depicted in the drawings). The light source can be arranged in an area inside the engine compartment of a motor vehicle.

A light panel 5 partitions the decoupling bay 3 into a rear bay 6, which contains straps, components, and structural elements arranged in the decoupling bay 3, in particular, the light decoupling elements 1 etc., and a front bay 8 facing a covering pane 7 that encloses the decoupling bay 3.

In accordance with a first embodiment of the present invention, a light panel 5' has receiving openings 9 for a light decoupling element 10 with a low beam functionality and for a light decoupling element 11 with fog light functuality. The receiving openings 9 are adapted to the contour of the light decoupling elements 10 and 11 such that the elements are housed loosely inside the receiving openings 9. The light decoupling elements 10 and 11 project from the light panel 5', at least their effective optical surfaces, such that the lighting functionality of the light decoupling elements 10, 11 is not impaired by the light panel 5'.

In an area 12 on one side of the light panel 5' there are a multitude of receiving openings 13 arranged in a circular form, each of which receives one light-emitting diode to generate a light array 14 for providing direction indicator functionality, such as that associated with vehicle turn indicators.

In one area of the light panel, adjacent to the area 12, a multitude of elongated-hole type through openings are envisaged extending as parallel slots 15 in a horizontal direction. These slots 15 serve as air input openings for the air flow generated by a heating/ventilation device arranged in the rear bay 6; the air flow can hence be guided onto the covering pane 7. Thereby sufficient ventilation and/or heating of the covering pane 7 can be facilitated as required, so that the transparency needed for the lighting function of the lighting device is ensured. The slots 15 preferably have a width of between 2 and 3 mm. To facilitate consistent and determined air guidance, the long sides of the slots 15 can be fitted with a projecting air guiding element (which is not depicted) that is integrally connected with the light panel.

Alternatively, the slots 15 can also run in a vertical direction in the shape of waves or arcs. It is important that the slots are evenly arranged, if possible, and surround the receiving openings 9 for the light decoupling elements 10, 11 in such a way that a homogeneous ventilation and/or heating of the covering pane 7 is ensured.

To achieve desired illumination, the light panel 5' may be made of a translucent material, e.g. PMMA and be structured e.g. ribbed such that the components arranged in the rear bay 6, specifically, a carrier plate 16 used to fix the light decoupling elements 10, 11 and the light-emitting diodes, are not perceivable visually. Such a visual "unification" of the rear bay 6 is enhanced by the slots 15 and/or the air guiding elements projecting therefrom.

Illumination may also be achieved by way a light source 17 arranged in the rear bay 6, which lights up said rear bay 6 and facilitates background lighting thereof in conjunction with the light panel 5'. Thus, in the off-status of the light decoupling elements 10, 11, homogeneous active lighting can be generated which, e.g. can serve as a position light of the lighting device.

Alternatively, the light source 17 can also be located in the rear bay 6 such that it facilitates a visual highlighting of the individual light decoupling elements 10, 11 or, in conjunction with a fully translucent light panel 5', of certain structural elements and components of the rear bay 6.

Figure 2:
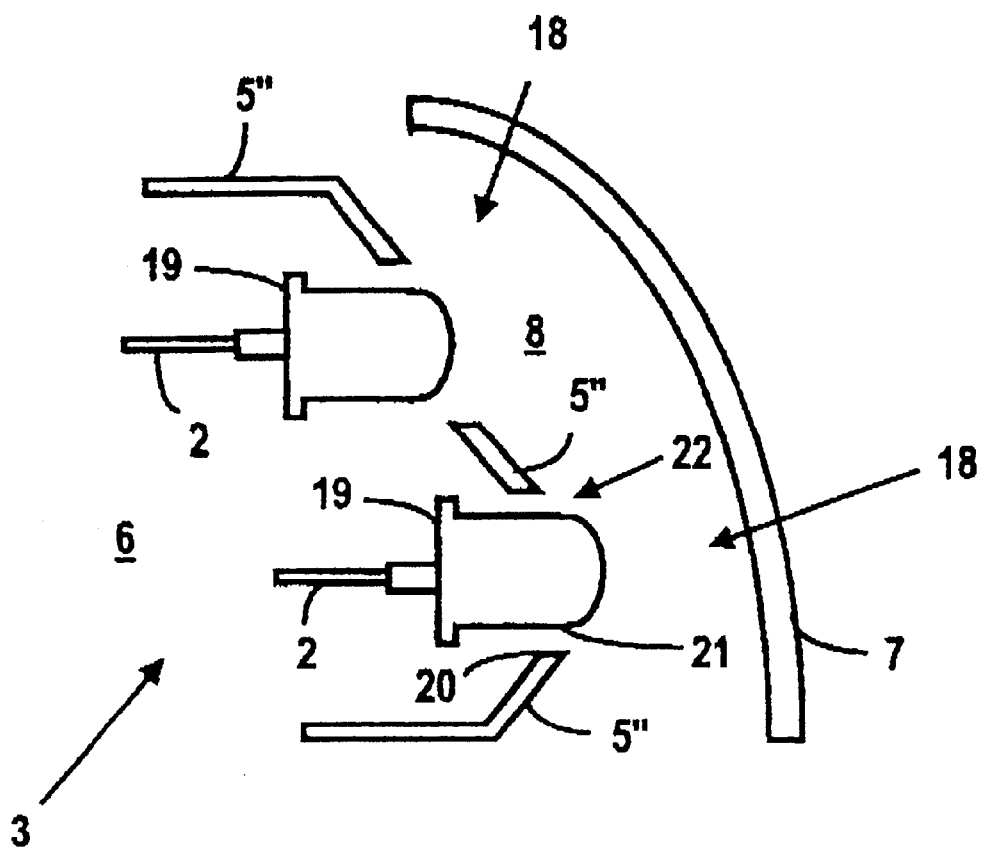
FIG. 2 illustrates a side view of an illumination device with a light panel in accordance with a second embodiment of the present invention.

In accordance with a second embodiment of the present invention, as is seen in FIG. 2, a light panel 5" can be provided in an inclined position whereby it extends essentially in parallel to the covering pane 7. The light panel 5" is mounted to the periphery of a carrier plate (which is not depicted) for supporting the structural elements and components. The light panel 5" has receiving openings 18 in each of which one light-decoupling element 19 may be facilitated. The light decoupling elements 19 are arranged on a carrier plate (which is not depicted) such that between an edge 20 of the receiving opening 18 and an external surface 21 of the light decoupling element 19 a circumferential slot 22 is created which serves as an air throughput opening for an air flow generated by a heating/ventilation device arranged in the rear bay 6. This process provides a simple way of ventilating and/or heating the covering pane 7, whereby the components located in the rear bay 6 can be visually hidden by a special design of the light panel 5" e.g. by way of coloring thereof and/or during production providing an opaque material.

Figure 3:
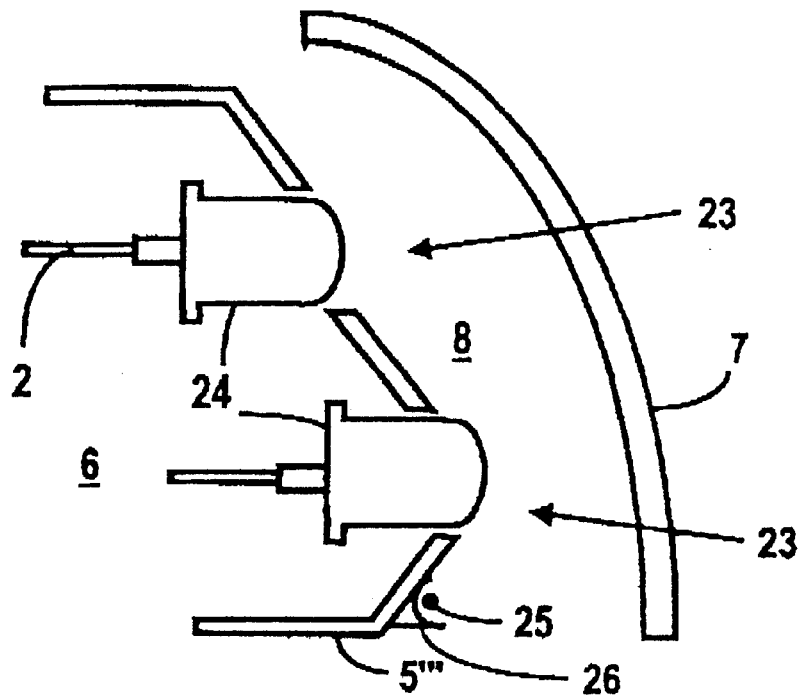
FIG. 3 illustrates a schematic side view of an illumination device with a light panel in accordance with a third embodiment of the present invention.

In accordance with another embodiment of the present invention, as is seen in FIG. 3, a light panel 5''' is made of a semi-translucent material, produced by vapor depositing, that visually hides the rear bay 6. The light panel 5''' has receiving openings 23 which each hold one light decoupling element 24 each; however, such elements are held loosely as compared to the preceding embodiment. To facilitate heating of the covering pane 7, one or several heating elements 25 are arranged on a surface of the light panel 5''' facing the covering pane 7. The heating elements 25 can be provided in the form of heating wires rimmed in a trough-shaped canal 26. The trough-shaped canal 26 extends in essentially horizontal direction across the entire length of the light panel 5'''. The canal is shaped like a dish and has a vapor-deposited aluminum coating that facilitates a well-directed heat radiation. The opening angle of the trough depends on the distance of the trough to the covering pane 7 and/or the dimensional characteristics of the covering pane's 7 surface to be heated.

Alternatively, the heating element 25 may also be an infrared radiator. The fact that the trough is shaped like a reflector allows a well-directed heat radiation.

Figure 4:
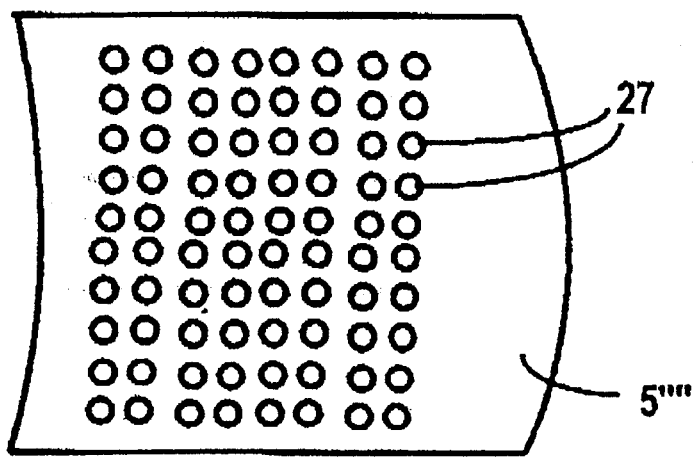
FIG. 4 illustrates a schematic partial view of a bulb in accordance with a fourth embodiment of the present invention.

In accordance with yet another embodiment of the present invention, as illustrated in FIG. 4, a light panel 5''''. may be fitted with a multitude of holes 27 in a grid-type arrangement providing through openings. This geometric design of the light panel 5'''' provides a certain visual effect. At a distance of several meters from the lighting device the light panel 5'''' appears to be two-dimensional and homogeneous. Only at a smaller distance are these relatively small holes 27 discernible such that structure and components that might be located in the rear bay 6 may be visible.

Figure 5:
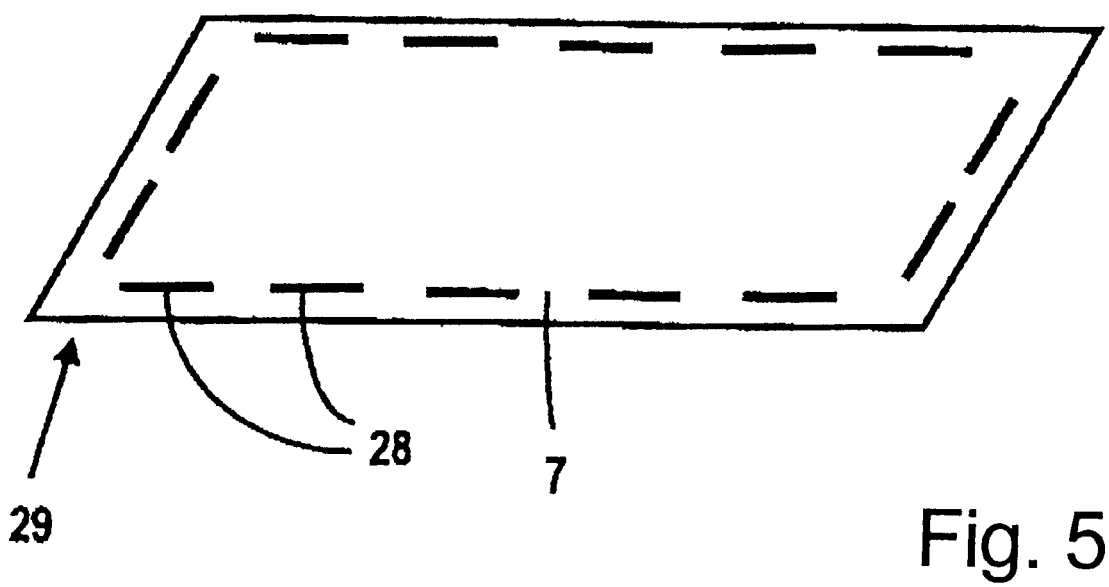
FIG. 5 illustrates a schematic view of a covering pane with heating elements.

In accordance with a variant of the lighting device as depicted in FIG. 5, a heating elements 28 can be fitted immediately to the covering pane 7 for the purpose of heating the covering pane 7. Several heating elements 28 that can be activated individually and autonomously are arranged in the periphery 29 of the covering pane. This arrangement of the heating elements 28 in segments allows heating of different areas of the covering pane 7 individually and autonomously such that a heating of the covering pane 7 is facilitated as need and therefore provides in energy saving. The heating elements 28 can be fitted as a conductive coating or printing, preferably on a surface of the covering pane facing the decoupling bay 3. The heating elements 28 are each connected to a control device (not depicted) via connection lines (not depicted).

The different geometries and features of the light panels described above can be combined with one another in any way. For example, the design of the light panel 5'''' with holes 27 can be combined both with a semi-translucent or non-translucent material embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting device for a vehicle, comprising an optical fiber for guiding a light emitted from a light source into a decoupling bay of the vehicle, with at least one light-decoupling element coupled in the decoupling bay and connected to one end of the optical fiber, the light-decoupling element emits the light according to a predetermined light distribution into an environment, wherein an opening of the decoupling bay (3) is tightly sealed by means of a covering pane (7) and that at a distance from the covering pane (7) a light panel (5, 5', 5", 5''', 5'''') extends across the decoupling bay (3) at an angle to an optical axis of the light decoupling element (1, 10, 11, 19, 24) and separates the decoupling bay (3) into a front bay (8) facing the covering pane (7) and a rear bay (6) opposite to the covering pane (7), and that the light panel (5, 5', 5", 5''', 5'''') is visually obscures components (16) arranged in the rear bay (6).

2. The lighting device in accordance with claim 1, wherein the light panel (5, 5', 5") is made of a translucent material and a surface of the light panel (5, 5', 5") has a predetermined structure.

3. The lighting device in accordance with claim 1, wherein the light panel (5, 5") is made of one of a semi-translucent and opaque material.

4. The lighting device in accordance with claim 1, wherein an additional light source (17) is arranged in the rear bay (6) providing a background illumination of the light panel (5, 5').

5. The lighting device in accordance with claim 1, wherein the light panel (5, 5', 5", 5''', 5'''') has a multitude of through openings (9, 15, 18, 23) providing for a penetration of an airflow therethrough and for employment of the light-decoupling element (1, 10, 11, 19, 25).

6. The lighting device in accordance with claim 5, wherein the through openings are formed by a multitude of slots (15) that extend essentially homogeneously in one direction of the light panel (5, 5').

7. The lighting device in accordance with claim 5, wherein the through openings are provided in the form of holes (27) extending in a grid arrangement across the light panel (5, 5'''').

8. The lighting device in accordance with claim 5, wherein the light decoupling element (19) is mounted in a through opening (18) of the light panel (5") by way of which forms a circumferential slot (22) between surfaces of the through opening (18) and light decoupling element (19).

9. The lighting device in accordance with claim 1, wherein the light panel (5, 5') provides areas with a multitude of receiving openings (13) arranged adjacent to one another for the reception of light sources such that the total number of light sources form a light array (14).

10. The lighting device in accordance with claim 1, wherein the light panel (5, 5', 5", 5''', 5'''') extends essentially in parallel with the covering pane (7).

11. The lighting device in accordance with claim 1, wherein a deposit is applied to the light panel (5, 5''') such that the light panel is provided semi-translucent in nature.

12. The lighting device in accordance with claim 1, wherein the light panel (5) is dyed.

13. The lighting device in accordance with claim 1, wherein at least one heating element (25) is arranged on one side of the lighting device (5, 5''').

14. The lighting device in accordance with claim 13, wherein the heating element (25) is arranged on a surface of the light panel (5, 5''') in the lower area facing the covering pane (7).

15. The lighting device in accordance with claim 13, wherein the heating element (25) is located in a canal (26) connected as one piece to the light panel (5, 5''').

16. The lighting device in accordance with claim 13, wherein the heating element (25) is provided in the form of a heating wire and that the canal (26) is provided as a trough-shaped reflector with a surface that reflects heat radiation onto the covering pane (7).

17. The lighting device in accordance with claim 1, wherein on one inner surface of the covering pane (7)

several adjacent heating elements (28) are arranged along the periphery thereof and the heating elements (28) can be selectively controlled.

18. The lighting device in accordance with claim 17, wherein the heating elements (28) are arranged in rows whereby the heating elements (28) opposite to each other can be activated simultaneously.

* * * * *